Jan. 26, 1965 J. C. KYLE 3,167,320
MOLECULAR SEAL
Filed Jan. 23, 1961
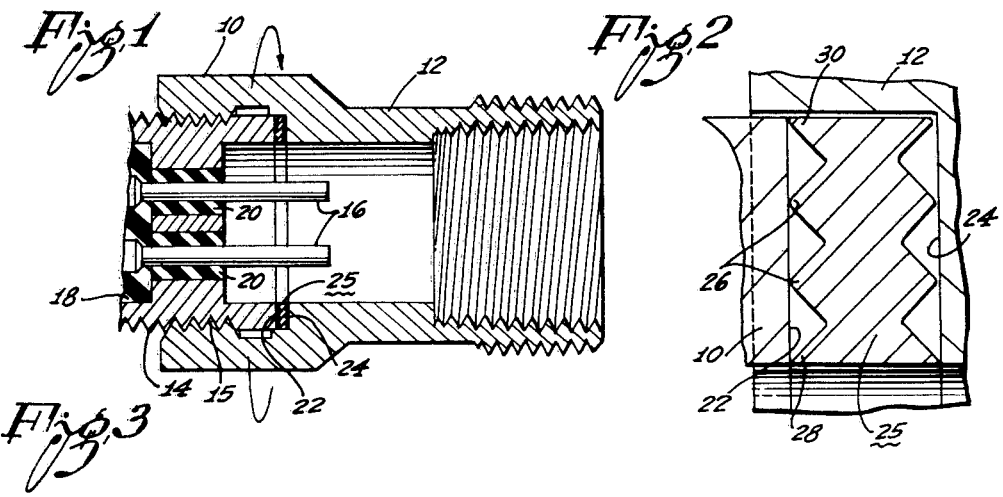
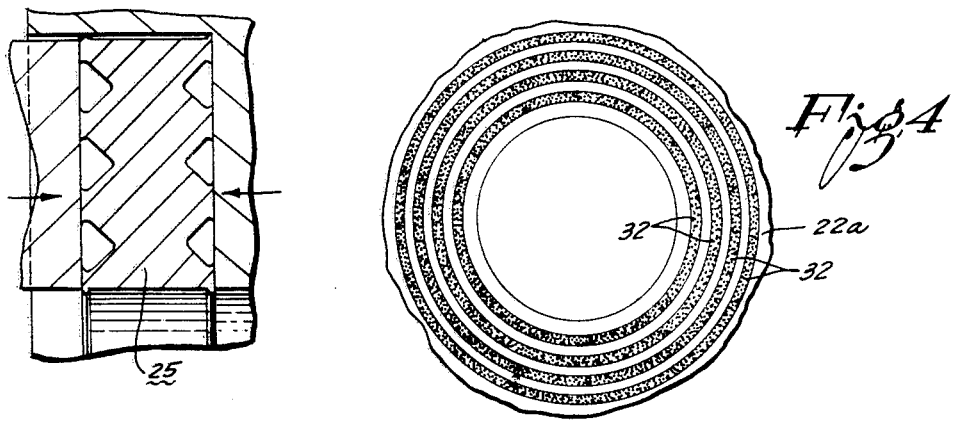
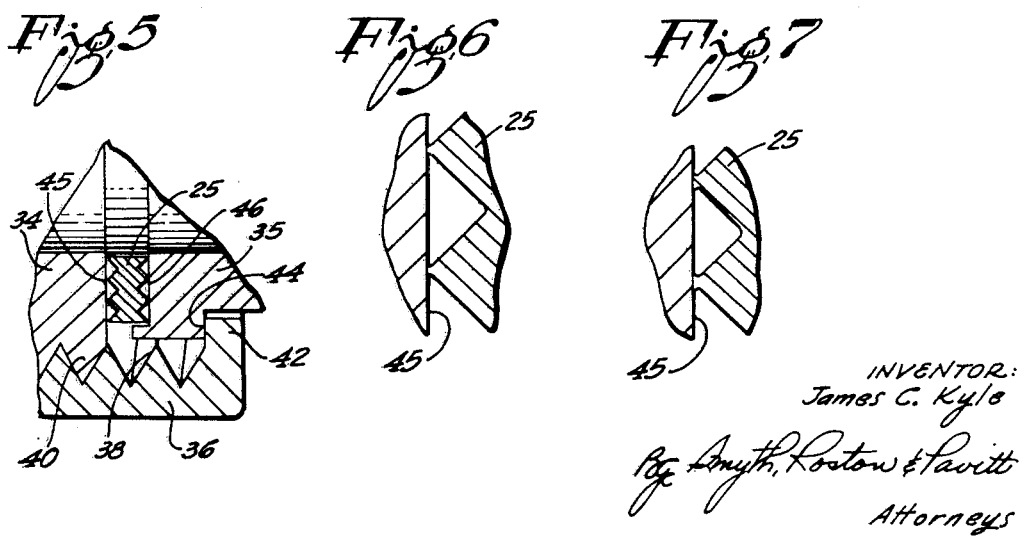
INVENTOR:
James C. Kyle
By Smyth, Roston & Pavitt
Attorneys

United States Patent Office 3,167,320
Patented Jan. 26, 1965

3,167,320
MOLECULAR SEAL
James C. Kyle, Glendora, Calif., assignor to Physical Sciences Corporation, Pasadena, Calif., a corporation of California
Filed Jan. 23, 1961, Ser. No. 84,228
2 Claims. (Cl. 277—1)

This invention relates to a method of and means for effecting a seal at a juncture between two metal parts. While the invention is widely applicable for static seals in general, it has been initially reduced to practice as a coupling seal and, more particularly, as a seal for an electrical connector for use in a high temperature environment.

The invention has special utility in an electrical connector for a missile wherein the coupling is exposed to the effects of highly corrosive fuel under high temperature conditions. One fuel, for example, subjects such a connector to a gaseous compound that forms nitric acid, and nitric acid inside the electrical conductor soon creates a short in the wiring.

The invention is based on the finding that molecular attraction becomes effective between two metals if the two metals are brought sufficiently close together, and the further finding that when two metals are maintained in such close contact progressive fusion occurs between the two metals. It is possible to utilize such molecular attraction and mutual fusion to make a fluid-tight seal between two metals. The required intimate metal-to-metal contact can be obtained, however, only by the application of exceedingly high pressure per unit area and even then sealing can be hindered by oxides and other contaminants.

The problem is to apply these findings to the creation of a fluid-tight seal in a coupling such as a small electrical connector. More specifically, the problem is to provide for the application of the required high unit pressure between a sealing ring and two cooperating coupling parts of the connector and to avoid the presence of excessive oxides or other foreign material at the metal interfaces.

This problem is solved, first, by using a sealing ring configuration that minimizes the contact areas and thus maximizes the unit pressure and, second, by selecting a metal for the sealing ring that is capable of considerable permanent deformation in solid state. Plasticity of the sealing ring is required in the sense of relatively high malleability, i.e., relatively high capability for permanent strain under compression before fracture occurs. The deformation or plastic flow of the metal of the sealing ring under high pressure dislodges oxides and contaminants sufficiently to bring fresh, clean metal surfaces together under the pressure and the plastic flow additionally causes useful transfer of the metal of the sealing ring to each of the two cooperating connector parts, the metal being transferred largely by a wiping action.

To carry out this concept, the sealing ring is made of malleable metal and is shaped to provide one or more narrow concentric ribs of tapered cross section on each of its sealing faces for pressure contact with the cooperating connector parts. In the selected embodiment of the invention, three concentric grooves are provided in each face of the sealing ring to form four narrow ribs of tapered cross section. With the contact area of each face of the sealing ring drastically reduced in this manner, the usual or normal pressure that is developed in the screw-thread tightening of the coupling or connector is adequate to cause the required plastic flow and the consequent effecting of a fluid-tight seal at each of the two opposite faces of the sealing ring.

The invention has special utility for use between two coupling parts that screw directly together because it utilizes the relative rotation that occurs at the sealing ring. As heretofore stated, the wiping action involved in the plastic flow of the sealing ring metal promotes transfer of the sealing ring metal to the abutting coupling parts, and the further rotary wiping action caused by screwing the coupling parts tightly together greatly increases the wiping action and the consequent desired transfer of the metal.

The importance of grooving the sealing ring to form the narrow ribs may be appreciated when it is considered that a tremendous pressure unattainable in practice would be required to obtain the same kind of molecular seal if the full area of the sealing ring were utilized. The formation of narrow sealing ring ribs reduces the required amount of energy to the amount of energy that is available in the simple screw tightening of a coupling or connector in a normal manner.

Once a coupling using the ribbed sealing ring is well tightened, it holds the sealing ring under pressure to cause further plastic flow of the sealing ring metal and the inherent resiliency of the threaded coupling parts maintains the pressure even though the sealing ring yields to some degree. This continued plastic flow under pressure slightly increases the contact areas for effective mutual molecular attraction, and the continued pressure promotes mutual fusion of the metals in the areas of contact. Thus the effectiveness of the seal increases for a period of time after a coupling is assembled.

It has been found that the ribbed sealing ring functions effectively even in a coupling which is tightened without relative rotation of the coupling parts at the sealing ring. In the assembly of such a coupling the sealing ring is subjected solely to compression, but sufficient radially outward and radially inward plastic flow occurs and sufficient delayed fusion of the metal occurs to make the coupling-joint fluid-tight.

The features and advantages of the invention may be understood from the following detailed description and the accompanying drawing.

In the drawing, which is to be regarded as merely illustrative:

FIG. 1 is a fragmentary longitudinal sectional view of an electrical connector incorporating a selected embodiment of the sealing ring;

FIG. 2 is a greatly enlarged radial section of the sealing ring in assembled position prior to the screw threaded tightening of the connector;

FIG. 3 is a view similar to FIG. 2 showing the deformation of the sealing ring that is created by the tightening of the connector;

FIG. 4 is a fragmentary end elevation of a tubular connector part that has been in pressure contact with a ribbed sealing ring over a period of time, the view showing how concentric rings of metal are transferred from the ribs of the sealing ring to the surface of the connector part;

FIG. 5 is a fragmentary sectional view of another type of connector in which a flanged nut is employed to draw the two connector parts together without the necessity of relative rotation between the two coupling parts, the parts being shown before the nut is tightened;

FIG. 6 is an enlarged fragmentary sectional view of a portion of FIG. 5 showing how the initial tightening of the nut causes initial plastic flow of the metal of the ribs of the sealing ring; and FIG. 7 is a view similar to FIG. 6 showing how the continued pressure on the sealing ring created by the resiliency of the coupling parts causes delayed plastic flow.

To illustrate a practice of the invention, FIG. 1 shows a portion of an electrical connector of a conventional type wherein two tubular connector members comprising a plug 10 and an adapter sleeve 12 have corresponding screw threads 14 and 15 by means of which the two parts screw together. The tubular plug 10 carries a pair of usual socket members 16 for mating with corresponding pins of a complementary electrical connector, the socket members being mounted in a plastic body 18 and extending through plastic sleeves 20. The base ends of the socket members 16 are intended to be welded or otherwise connected to a corresponding pair of electrical conductors (not shown) of a cable.

The described connector construction provides a joint between the plug 10 and the adapter sleeve 20 with two confronting annular joint faces or surfaces, namely, an annular joint surface 22 of the plug and an annular joint surface 24 of the adapter sleeve. The metals of the plug 10 and the adapter sleeve 12 are corrosion resistant metals, in this instance being stainless steel, and the problem solved by the invention is to provide a fluid-tight seal between the two confronting joint surfaces 22 and 24 that will also effectively resist corrosion. For this purpose, the invention provides a sealing ring 25 of suitably malleable metal or of metal that is at least more malleable than the metal of the confronting joint surfaces.

The common metals may be listed in order of decreasing malleability as follows: gold, silver, copper and aluminum. All of these four metals are highly suitable for the present purpose, and platinum is also suitable. Various alloys are sufficiently malleable, including alloys containing indium, tin, bismuth and lead. Where a stainless steel sealing ring is required between two stainless steel parts, the two parts may be made of AISI 304L stainless steel, and the interposed sealing ring may be made of AISI 302 stainless steel which is more malleable than the AISI 304L. Thus, in FIG. 1 the two connector members 10 and 12 may be made of AISI 304L stainless steel and the sealing ring 25 may be made of AISI 302 stainless steel. The essential fact is that the sealing ring be sufficiently malleable for the required plastic flow.

In the tightening of a joint by screw action, there is a limit to the pressure that may be developed between the joint surfaces in the procedure of assembly. The problem is to use the available pressure for the creation of a molecular seal. It is contemplated that the metal of the sealing ring will be sufficiently malleable and the areas of contact of the sealing ring with the confronting joint surfaces will be sufficiently reduced that the required plastic flow will be created by the amount of pressure that is normally developed. The areas of contact between the sealing ring and the confronting surfaces must be greatly reduced in comparison with the area of the confronting surfaces in order to develop the required high unit pressure. It is for this purpose that each face of the sealing ring is formed with one or more annular ribs that are of tapered configuration to minimize the areas of contact.

In this particular practice of the invention, the relatively malleable metal sealing ring 25 is formed on each of its opposite faces with a plurality of three annular grooves. The annular grooves are flared in the sense that their side walls are divergent as shown. The four grooves form two intermediate annular ribs 26 of tapered configuration as well as an inner rib 28 and outer rib 30 both of tapered configuration. In this instance, the depth of the grooves is .005 inch with the sides of the grooves at angles of 45 degrees relative to the axis of the sealing ring. The result is that the four ribs are triangular in cross section and are spaced apart, center to center, .010 inch. The two sides of each of the intermediate ribs 26 are at an angle of 90 degrees relative to each other, and the two sides of each of the inner and outer ribs 28 and 30 are at an angle of 45 degrees from each other.

FIG. 2 shows the sealing ring 25 positioned between the two confronting joint surfaces 22 and 24 prior to the tightening of the joint by screw action. FIG. 3 shows the result of tightening the joint with screw action with the consequent drawing of the two confronting joint surfaces 22 and 24 towards each other to compress the sealing ring 25 and with consequent relative rotation between the two confronting joint surfaces.

It can be seen in FIG. 3 that each of the narrow ribs has been truncated by plastic flow under exceedingly high pressure per unit area. The spreading or widening of the ribs by plastic flow of the metal of the sealing ribs in radially outward and radially inward directions under high unit pressure together with the scouring action created by the relative rotation at the areas of contact of the ribs brings fresh, clean metal of the sealing ring into intimate contact with fresh, clean metal of the two confronting joint surfaces under such high pressure that molecular attraction becomes effective to make bonds across the metal interfaces.

The plastic flow causes transfer of the metal of the ribs to the confronting sealing surfaces and this transfer of metal is promoted by the sliding action that is created by relative rotation between the metal of the sealing ring and the metal of the confronting joint faces. This action develops such intimate contact of the metals at the metal interfaces that molecular attraction becomes effective and fusion occurs across the metal interfaces to result in molecular bonding at the interfaces that is highly effective for sealing in a fluid-tight manner.

The fusion across the metal interfaces is progressive and continues under the sustained pressure long after the joint is assembled. If such a joint is dismantled even after only a very brief period, it will be found that the metal transferred from the ribs to each of the two confronting joint faces will have resulted in annular ring-shaped deposits of the rib metal. FIG. 4, for example, shows rings 32 of transferred rib material on a joint surface 22a as observed after a joint is dismantled. While a single annular rib may be used to effect a fluid-tight seal in the above described manner, it is advantageous to provide a plurality of annular ribs to achieve greater reliability. The four annular sealing ribs at each metal interface shown in FIG. 3 act in series in their sealing action so that any leakage must occur past all four ribs and it is sufficient for only one rib to be completely fluid-tight.

As heretofore stated, although the wiping action involved in relative rotation at the metal interfaces is helpful and highly desirable, nevertheless a sealing ring of the character described is effective for a fluid-tight seal under pressure even when no relative rotation occurs. FIG. 5, for example, shows a joint between two cooperating members 34 and 35 which are clamped together by a nut 36. In a well-known manner, the nut has an internal screw thread 38 in engagement with an external screw thread 40 of the member 34 and has an inner radial flange 42 for engagement with an outer circumferential shoulder 44 of the second member 35. The two cooperating members 34 and 35 have respectively confronting annular joint surfaces 45 and 46, and the tightening of the nut 36 draws these joint surfaces towards each other without necessarily causing rotation between the joint surfaces.

A previously described sealing ring 25 is shown interposed between the two confronting joint surfaces 45 and 46 in FIG. 5 in preparation for tightening the nut. Tightening the nut causes the sealing ribs to be appreciably truncated by plastic flow as indicated in FIG. 6. Under sustained pressure, the plastic flow may continue somewhat, as indicated in FIG. 7, but in any event fusion of the two metals continues across the interface. The pressure continues even though yielding of the sealing ring may occur after the nut is tightened, the continued pressure being explained by the spring action inherent in the coupling, there being sufficient resiliency of the metal parts for this effect.

While tightening of the nut 36 does not cause relative rotation between the two members 34 and 35 in the joint construction shown in FIG. 5, such relative rotation may be deliberately created in the course of tightening the nut for the sake of creating sliding action at the metal interfaces. The relative rotation, of course, promotes the effectiveness of the seal, as heretofore explained.

Our description in specific detail of the selected embodiment of the invention will suggest various changes, substitutions and other departures from our description, within the spirit and scope of the appended claims.

I claim:
1. A method of forming a static fluid-tight seal at a joint surface formed from metals of a particular malleability characterized by the steps of:
  abutting against the joint surface a sealing ring formed from a material having a greater malleability than the particular malleability and formed with at least one narrow rib to reduce the areas of contact with the joint surface to an area substantially less than the cross-sectional area of the rib in the plane of the rib;
  placing the ring under sufficient pressure relative to the joint surface to produce a plastic flow of the material of the rib against said joint surface for a widening of the rib and a transfer of the material of the rib to the joint surface without any deformation of the joint surface and for the creation of a molecular bond between the rib and the joint surface and the fusing of the material of the rib with the metal of the joint surface; and
  causing relative concentric rotation between the rib and the joint surface for a wiping action to promote the transfer of metal from the rib to the joint surface.

2. A method of forming a static fluid-tight seal at an annular joint surface at the juncture of two cooperating parts having a particular malleability, which parts screw together with relative rotation for the creation of pressure at the joint surface, characterized by the step of placing against the joint surface a sealing ring formed with at least one narrow annular rib of tapered cross section in abutment with the joint surface, the sealing ring having a greater malleability than the particular malleability whereby the concentration of the screw generated pressure on the restricted area of contact of the rib with the joint surface causes plastic flow of the rib along the joint surface and wiping action under pressure by virtue of the relative rotation of the parts at the joint surface to provide a widening of the rib and a fusion of the rib with the joint surface for the creation of a molecular bond between the rib and the joint surface.

References Cited in the file of this patent
UNITED STATES PATENTS

| | | |
|---|---|---|
| 906,761 | White | Dec. 15, 1908 |
| 1,834,581 | Ferrel et al. | Dec. 1, 1931 |
| 1,957,605 | Lamont | May 8, 1934 |
| 2,543,963 | Gaffin | Mar. 6, 1951 |

FOREIGN PATENTS

| | | |
|---|---|---|
| 1,130,563 | France | Oct. 1, 1956 |